(12) United States Patent
Chen et al.

(10) Patent No.: US 10,728,993 B2
(45) Date of Patent: Jul. 28, 2020

(54) DRIVER CIRCUIT FOR PROVIDING CONSTANT VOLTAGE TO AN AUXILIARY CIRCUIT

(71) Applicants: Timothy Chen, Aurora, OH (US); Andrew Hussey, Stow, OH (US); Hao Wang, Twinsburg, OH (US)

(72) Inventors: Timothy Chen, Aurora, OH (US); Andrew Hussey, Stow, OH (US); Hao Wang, Twinsburg, OH (US)

(73) Assignee: TECHNICAL CONSUMER PRODUCTS, INC., Aurora, OH (US)

( * ) Notice: Subject to any disclaimer, the term of this patent is extended or adjusted under 35 U.S.C. 154(b) by 0 days.

(21) Appl. No.: 16/285,017

(22) Filed: Feb. 25, 2019

(65) Prior Publication Data

US 2019/0191532 A1 Jun. 20, 2019

Related U.S. Application Data

(63) Continuation of application No. 16/019,933, filed on Jun. 27, 2018, now Pat. No. 10,219,361, which is a (Continued)

(51) Int. Cl.
| | |
|---|---|
| H05B 47/19 | (2020.01) |
| H05B 45/10 | (2020.01) |
| H05B 45/37 | (2020.01) |

(52) U.S. Cl.
CPC ............ *H05B 47/19* (2020.01); *H05B 45/10* (2020.01); *H05B 45/37* (2020.01); *Y02B 20/347* (2013.01)

(58) Field of Classification Search
CPC .. H05B 33/0815; H05B 39/04; H05B 39/048; H05B 37/02; H05B 33/0845;
(Continued)

(56) References Cited

U.S. PATENT DOCUMENTS

| 5,654,613 A | 8/1997 | Kim et al. |
| 7,378,826 B2 | 5/2008 | Liao |

(Continued)

OTHER PUBLICATIONS

U.S. Office Action, U.S. Appl. No. 14/723,553, 29 pages, (dated Oct. 3, 2016).
(Continued)

*Primary Examiner* — Monica C King
(74) *Attorney, Agent, or Firm* — Thompson Hine LLP (57) ABSTRACT

A driver circuit receiving wireless communication over a wireless network is disclosed. The driver circuit includes a lighting load, a main driver, and an auxiliary driver. The lighting load is selectively illuminated based on an output voltage being provided to the lighting load that is at least a forward voltage of the lighting load. The wireless communication is indicative of whether the lighting load is to be illuminated. The main driver is for controlling current and voltage within the driver circuit such that if the wireless communication indicates the lighting load is to be illuminated, then the current delivered to the lighting load is regulated by the main driver, and if the wireless communication indicates the lighting load is not to be illuminated, then the output voltage delivered to the lighting load is controlled by the main driver is below the forward voltage.

26 Claims, 6 Drawing Sheets

Related U.S. Application Data continuation of application No. 14/723,553, filed on May 28, 2015, now Pat. No. 10,034,355.

(58) Field of Classification Search
CPC ............ H05B 33/0848; H05B 33/0818; H05B 33/0803; H05B 33/0842; H05B 33/0866; H05B 39/044; H05B 41/3924; H05B 37/0281; H05B 41/2827; H05B 41/2828; H05B 41/3927; H05B 33/0851; H05B 37/0263

See application file for complete search history.

(56) References Cited

U.S. PATENT DOCUMENTS

| | | |
|---|---|---|
| 8,659,237 B2 | 2/2014 | Archenhold |
| 8,680,787 B2 | 3/2014 | Veskovic |
| 8,982,521 B2 | 3/2015 | Hu et al. |
| 9,024,540 B2 | 5/2015 | Zhang et al. |
| 9,113,528 B2 | 8/2015 | Bora et al. |
| 9,220,150 B2 | 12/2015 | Hartmann et al. |
| 2008/0111491 A1 | 5/2008 | Spira |
| 2009/0278473 A1 | 11/2009 | Van Erp |
| 2012/0080944 A1* | 4/2012 | Recker ............... H02J 9/02 307/25 |
| 2013/0200707 A1 | 8/2013 | Hartmann et al. |
| 2014/0001962 A1 | 1/2014 | Harris |
| 2014/0145615 A1 | 5/2014 | Goscha et al. |
| 2014/0152188 A1 | 6/2014 | Bora et al. |
| 2015/0351188 A1 | 12/2015 | Chen et al. |
| 2015/0359052 A1 | 12/2015 | van den Broeke et al. |

OTHER PUBLICATIONS

U.S. Office Action, U.S. Appl. No. 14/723,553, 11 pages, (dated Apr. 7, 2017).

U.S. Notice of Allowance, U.S. Appl. No. 14/723,553, 7 pages, (dated Mar. 27, 2018).

PCT, International Search Report and Written Opinion, International Application No. PCT/US2016/032979, 8 pages, (dated Aug. 25, 2016).

* cited by examiner

DRIVER CIRCUIT FOR PROVIDING CONSTANT VOLTAGE TO AN AUXILIARY CIRCUIT

TECHNICAL FIELD

The present disclosure relates generally to a driver circuit for providing constant power, and more particularly to a driver circuit for a lighting load that provides substantially constant DC voltage to an auxiliary circuit without the need for dedicated power circuitry.

BACKGROUND

Wireless lighting control systems may utilize radio frequency (RF) communication to communicate control signals to an antenna element mounted in a lighting fixture. For example, a user may turn on, turn off, or dim a light using wireless control. A wireless lighting fixture typically includes a main driver as well as a micro control unit (MCU)/radio. The main driver may be used to control the load for dimming and color control, as well as to turn the wireless lighting fixture ON and OFF, and the MCU/radio may be used to facilitate wireless communication of the lighting fixture.

Power consumption has always been a consideration in RF networks. With wireless control, when the light fixture is turned ON the MCU/radio is in receive mode and therefore requires power. Furthermore, if the lighting fixture is turned OFF, and there is no power being delivered to the lighting load, then the MCU/radio is in standby mode. However, the MCU/radio still requires power when in standby mode. Thus, it is appreciated that the MCU/radio requires a low voltage power supply at all times, regardless of whether the lighting fixture is ON or OFF. Therefore, it may be challenging to produce a lighting fixture with RF capability at low cost with direct communication between the main driver and the MCU/radio. It may also be challenging to supply power to the MCU/radio without the need for dedicated circuitry, which add cost and complexity to the lighting fixture. Thus, there exists a continuing need in the art for a lighting fixture with an improved control scheme for supplying continuous power to the MCU/radio.

SUMMARY

In one embodiment, a driver circuit receiving wireless communication over a wireless network is disclosed. The driver circuit includes a lighting load, a main driver, and an auxiliary driver. The lighting load is selectively illuminated based on an output voltage being provided to the lighting load that is at least a forward voltage of the lighting load. The wireless communication is indicative of whether the lighting load is to be illuminated. The main driver is for controlling current and voltage within the driver circuit such that if the wireless communication indicates the lighting load is to be illuminated, then the current delivered to the lighting load is regulated by the main driver, and if the wireless communication indicates the lighting load is not to be illuminated, then the output voltage delivered to the lighting load is controlled by the main driver is below the forward voltage. The auxiliary driver requires a substantially constant DC voltage, and is in communication with the main driver. The auxiliary driver receives the wireless communication over the wireless network, where the driver circuit provides the substantially constant DC voltage at all operating conditions.

In another embodiment, a driver circuit receiving wireless communication over a wireless network is disclosed. The driver circuit includes a lighting load, a main driver, and an auxiliary driver. The lighting load is selectively illuminated based on an output voltage being provided to the lighting load that is at least a forward voltage of the lighting load. The wireless communication is indicative of whether the lighting load is to be illuminated. The main driver is for controlling voltage within the driver circuit such that if the wireless communication indicates the lighting load is to be illuminated, then the output voltage provided to the lighting load is at least the forward voltage, and if the wireless communication indicates that the lighting load is not to be illuminated, then the voltage delivered to the lighting load is below the forward voltage. The auxiliary driver requires a substantially constant DC voltage, and is in communication with the main driver. The auxiliary driver receives the wireless communication over the wireless network, where the driver circuit provides the substantially constant DC voltage at all operating conditions.

In yet another embodiment, a driver circuit receiving wireless communication over a wireless network includes a lighting load, a switch, a network that selectively generates an overvoltage value, a main driver, and an auxiliary driver. The lighting load is selectively illuminated based on an output voltage being provided to the lighting load that is at least a forward voltage of the lighting load. The wireless communication is indicative of whether the lighting load is to be illuminated. The main driver includes a plurality of inputs, and is in communication with the switch and the network. The main driver and includes control logic for causing the switch to operate in burst packets at a burst mode in response to receiving the overvoltage value from the network. The main driver controls voltage to the lighting load such that if the wireless communication indicates the lighting load is not to be illuminated, then the forward voltage is not provided to the lighting load. The auxiliary driver requires a substantially constant DC voltage, and is in communication with the main driver. The auxiliary driver receives wireless communication over a wireless network. The auxiliary driver includes control logic for monitoring the wireless network for an OFF signal. The auxiliary driver includes control logic for inducing a switching signal at one of the plurality of inputs of the main driver in response to receiving the OFF signal over the wireless network. In response to receiving the switching signal, the main driver increases a frequency of the burst packets to a threshold frequency to generate the constant DC voltage required by the auxiliary driver during burst mode.

DETAILED DESCRIPTION

The following detailed description will illustrate the general principles of the invention, examples of which are additionally illustrated in the accompanying drawings. In the drawings, like reference numbers indicate identical or functionally similar elements.

Figure 1:
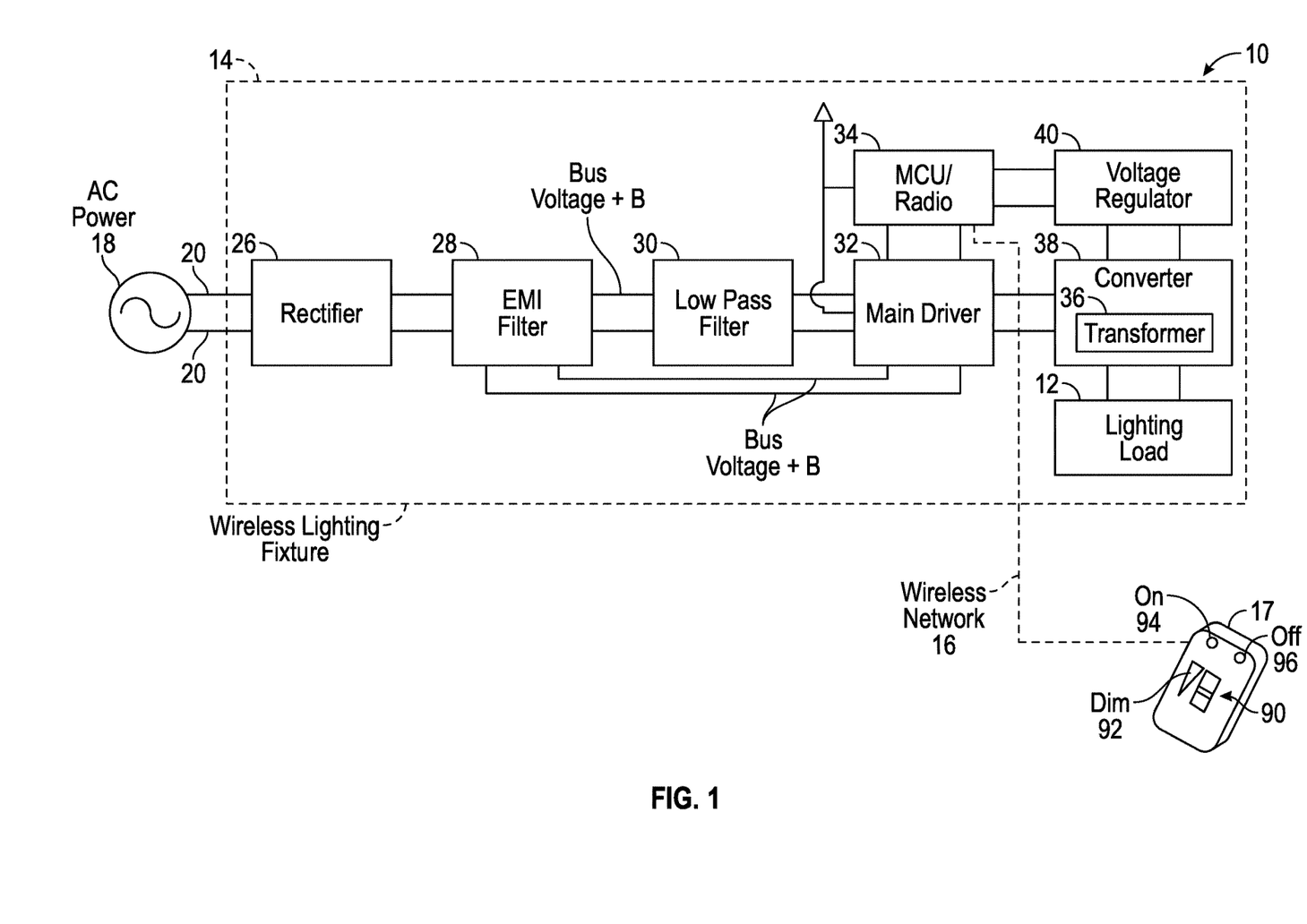
FIG. 1 is an exemplary block diagram of a wireless lighting fixture having a driver circuit, where the driver circuit includes a main driver and a micro control unit (MCU)/radio.
Figure 2:
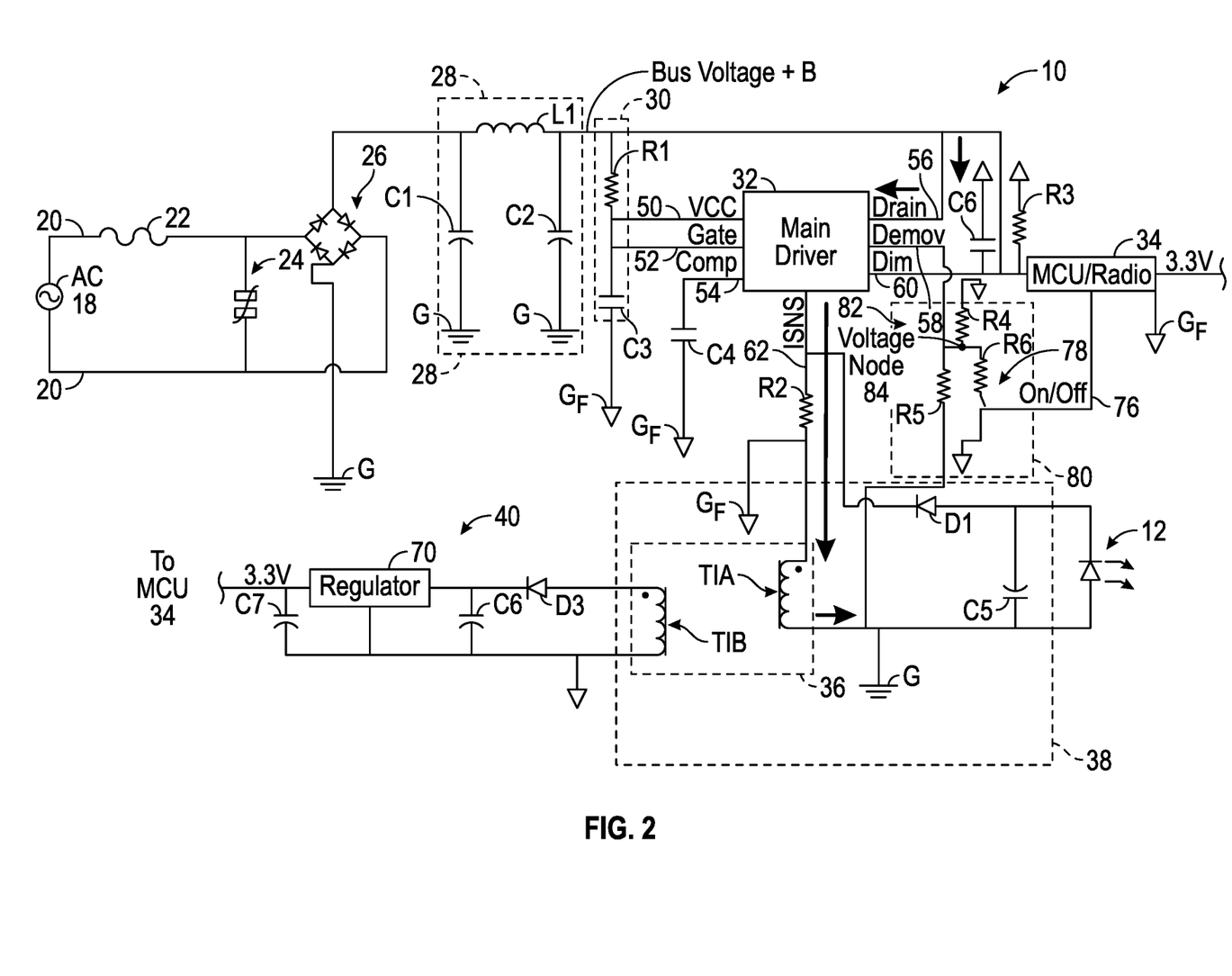
FIG. 2 is an exemplary circuit diagram of the driver circuit shown in FIG. 1, during a first stroke of operation.
Figure 3:
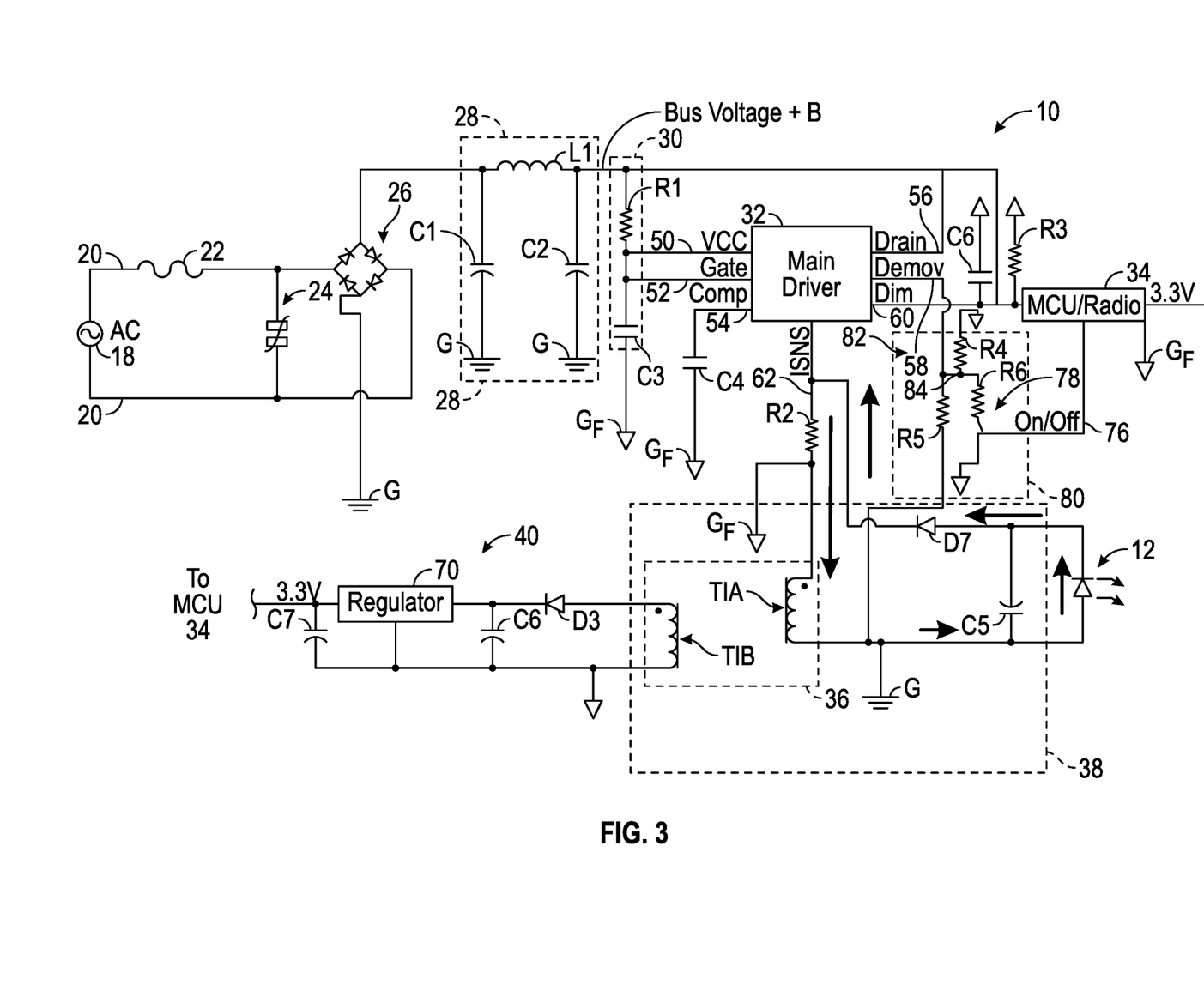
FIG. 3 is an exemplary circuit diagram of the driver circuit shown in FIG. 1, during a second stroke of operation.

FIG. 1 is an exemplary block diagram of a driver circuit 10 for driving a lighting load 12. In one exemplary embodiment, the driver circuit 10 may be part of a wireless lighting fixture 14. As explained in greater detail below, the lighting fixture 14 may be connected to a wireless network 16 that allows for an individual to turn the lighting fixture 14 ON and OFF and dim the lighting load 12 as well by manipulating a user input device 17. The lighting load 12 may include one or more light emitting diodes (LEDs), which are illustrated in FIGS. 2-3. However, it is to be understood that other types of lighting elements may be used for the lighting fixture 14 as well such as, for example, compact fluorescent lamps (CFLs) and halogen lighting. The driver circuit 10 may include a pair of power input lines 20 for connection to a source of AC power 18 such as, for example, main power lines at nominal 120 or 230 volts AC. The driver circuit 10 may also include a fuse 22 (FIG. 2), a varistor such as a metal-oxide varistor (MOV) 24 (FIG. 2), a rectifier 26, an electromagnetic interference (EMI) filter 28, a low pass filter 30, a main driver 32, a second driver that is illustrated as a micro control unit (MCU)/radio 34, a transformer 36, a converter 38, and a voltage regulator 40.

As explained in greater detail below, the disclosed driver circuit 10 provides substantially constant DC voltage (e.g., 3.3 volts) to the MCU/radio 34 without dedicated circuitry, even if the lighting fixture 14 is turned OFF and the lighting load 12 is no longer illuminated to produce visible light. It should be understood that in one embodiment the MCU/radio 34 may be duty-cycled part of the time in receive mode when the lighting fixture 14 is ON, however substantially constant DC voltage still encompasses this approach. Furthermore, although an MCU/radio 34 is shown in the figures, it is to be understood that this illustration is merely exemplary in nature and the disclosure should not be limited to supplying constant DC voltage to an MCU/radio. The disclosed driver circuit 10 may be used to provide constant DC voltage to any other type of secondary or auxiliary circuit requiring constant DC voltage as well such as, for example, a sensor network for sensing ambient light, or bias circuitry.

Referring to both FIGS. 1 and 2, the input lines 20 of the driver circuit 10 may be connected to the rectifier 26. The rectifier 26 converts incoming AC power from the source of AC power 18 to a pulsing DC power. Although the rectifier 26 is shown in FIG. 2 as a full wave diode bridge rectifier, any other type of full wave rectifier may be used as well. The output of the rectifier 26 may be connected to the EMI filter 28. As seen in FIG. 2, in one non-limiting example the EMI filter 28 may include an inductor L1 connected to two capacitors C1 and C2. The output of the EMI filter 28 may be referred to as a bus voltage +B of the driver circuit 10. The low pass filter 30 may receive the bus voltage +B. In the embodiment as shown in FIG. 2, the low pass filter 30 is a passive low pass filter including a resistor R1 and a capacitor C3, however it is to be understood that this configuration is exemplary in nature and any number of passive components may be used. Those of ordinary skill in the art will appreciate that the resistor R1 is a pull-up resistor. As seen in FIG. 2, the low pass filter 30 is connected to power supply pin ($V_{CC}$), which is also referred to as a power input pin 50. The low pass filter 30 is also connected to a GATE pin 52 of the main driver 32.

The main driver 32 may refer to, be part of, or include an electronic circuit, a combinational logic circuit, a field programmable gate array (FPGA), a processor (shared, dedicated, or group) that executes code, other suitable components that provide the described functionality, or a combination of some or all of the above, such as in a system-on-chip. The term module may include memory (shared, dedicated, or group) that stores code executed by the processor. The term code, as used above, may include software, firmware, microcode, or assembly code and may refer to programs, routines, functions, classes, or objects. One commercially available example of the main driver 32 is integrated circuit (IC) model number SSL5235, which is commonly used for LED dimming control, and is available from NXP B.V., of Eindhoven, the Netherlands. However, it is to be understood that any other IC for regulating the current and controlling the voltage to the lighting load 12 may be used as well.

Continuing to refer to FIG. 2, the main driver 32 may also include other inputs or pins as well, such as a loop compensation pin 54 (COMP), a drain pin 56 (DRAIN), an overvoltage protection pin 58 (DEMOV), a dim pin 60 (DIM), and a ground current sense pin 62 (ISNS). In one embodiment, the loop compensation pin 54 (COMP) of the main driver 32 is connected to a floating ground $G_F$ through a capacitor C4, and the ground current sense pin 62 of the main driver 32 is connected to the floating ground $G_F$ by a sense resistor R2.

Although FIGS. 1 and 2 illustrate the main driver 32 connected to the floating ground $G_F$, it is to be understood that this illustration is merely exemplary in nature, and the main driver 32 may be connected to a common ground G of the driver circuit 10 as well. Similarly, the MCU 34 is illustrated in the figures as connected to the floating ground $G_F$ as well (i.e., the main driver 32 and the MCU/radio 34 both share the same ground, which is the floating ground $G_F$.) However, it is to be understood that the MCU/radio 34 may be connected to the common ground G of the driver circuit as well. In one embodiment, the main driver 32 may be connected to the floating ground $G_F$, and the MCU/radio 34 may be connected to the common ground G. Alternatively, in another embodiment the main driver 32 may be connected to the common ground G, and the MCU/radio 34 may be connected to the floating ground $G_F$.

The drain pin 56 may receive the bus voltage +B of the driver circuit 10. The drain pin 56 represents a drain of a metal-oxide-semiconductor field-effect transistor (MOSFET) located within the main driver 32 (the MOSFET is not illustrated in the figures), which is herein referred to as the switch of the main driver 32. Those of ordinary skill in the art will readily appreciate that while a MOSFET is described, the main driver 32 is not limited to only a MOSFET, and other types of switches or transistors such as, for example, a bipolar junction transistor (BJT) may be used as well. Moreover, although the present disclosure describes a switch that is integrated within the main driver 32, those of ordinary skill in the art will readily understood that the switch may be external to the main driver 32 as well, where the main driver 32 may include control logic or circuitry for driving an external switch. One commercially available example of an IC for driving an external switch is model number SSL5231 available from NXP B.V., of Eindhoven, the Netherlands.

Delivering power to the power input pin 50 of the main driver 32 will in turn activate or turn on the main driver 32. Once the main driver 32 is activated, this allows the main driver 32 to operate in switching mode, where the switch of the main driver 32 (i.e., the integrated MOSFET, which is not illustrated in FIG. 2) switches between an open and closed position. As seen in FIG. 2, once the main driver 32 is activated, and the driver circuit 10 may operate at a first stroke where current from the bus voltage +B of the driver circuit 10 may flow out of the drain pin 56 of the main driver 32. During the first stroke, the switch of the main driver 32 is closed. This allows for the current received at the drain pin 56 of the main driver 32 to exit the main driver 32 through the ground current sense pin 62.

The current exiting the ground current sense pin 62 may flow through the sense resistor R2 to the converter 38. In the embodiment as shown in FIG. 2, the converter 38 is a buck/boost converter including the transformer 36. The transformer 36 has a primary side winding T1A and secondary side winding T1B. The converter 38 also includes a flyback or freewheeling diode D1. In one exemplary embodiment, the freewheeling diode D1 is a Schottky diode. Although a buck/boost converter is illustrated, those skilled in the art will appreciate that other types of voltage step down converters may be used as well such as for example, flyback converters, a buck converter, or a boost converter. The current flowing from the sense resistor R2 flows through the primary side winding T1A of the transformer 36 during the first stroke, thereby increasing the current in the primary side winding T1A from zero.

The converter 38 may be used to provide current to the lighting load 20 during a second stroke of the driver circuit 10. During the second stroke, the switch of the main driver 32 (not illustrated) is open. Thus, current flowing into the drain pin 56 of the main driver 32 may not flow out of the main driver 32 through the ground current sense pin 62. The flow of current through the driver circuit 10 during the second stroke is illustrated in FIG. 3. Turning now to FIG. 3, during the second stroke current may flow from the primary side winding T1A to a capacitor C5. The capacitor C5 may be used to reduce or substantially eliminate any ripple from the output of the converter 38. The current may then flow out of the capacitor C5 and to the lighting load 12. The current may flow out of the lighting load 12 through the freewheeling diode D1, and back to the ground current sense pin 62 of the main driver 32. The current in the primary side winding T1A now approaches zero. Once the current is about zero, a new switching cycle may begin, and the switch of the main driver 32 (i.e., the MOSFET, which is not illustrated) is closed.

Continuing to refer to FIG. 3, the voltage regulator 40 may include the secondary side winding T1B of the converter 38, a diode D3 arranged in series with the secondary side winding T1B, a linear voltage regulator 70, and capacitors C6 and C7 arranged in parallel with one another. The voltage regulator 70 may be used to produce the constant DC voltage supplied to the MCU/radio 34. In one exemplary embodiment, the constant DC voltage supplied to the MCU/radio 34 may be about 3.3 volts, however it is to be understood that this value is merely exemplary in nature. Those of ordinary skill in the art will readily understand that other voltage values may be provided as well, depending on the specific requirements of the MCU/radio 34.

The number of turns on the secondary side winding T1B may be adjusted in order to step down the voltage from the primary side winding T1B of the converter 38 before the voltage from the primary side winding T1B is sent to the linear voltage regulator. For example, in one embodiment the secondary side winding T1B may step down the voltage from the primary side winding T1A from about 60 volts to about 6 volts. This in turn may reduce the amount of heat that is dissipated from the linear voltage regulator 70. Specifically, the secondary side winding T1B may be used to step down the voltage from the converter 38 first, before the linear regular 70 further steps down the voltage from the converter 38. Those skilled in the art will readily appreciate that the voltage from the converter 38 may be directly provided to the linear regular 70, however this approach may generate more heat and is not as efficient as the illustrated approach.

The MCU/radio 34 may be supplied low voltage power even if the lighting load 12 is not illuminated. Continuing to refer to both FIGS. 2-3, in one embodiment the MCU/radio 34 may be any type of driver for providing wireless communication of the driver circuit 10, and is in communication with the wireless network 16 (FIG. 1). Some examples of wireless communication protocols that the MCU/radio 34 may be compatible with include, but are not limited to, Bluetooth®, ZigBee® and 6LoWPAN. One commercially available example of the MCU/radio 34 is integrated circuit (IC) model number JN5164, which is commonly used for wireless communication, and is available from NXP B.V., of Eindhoven, the Netherlands. As mentioned above, although a MCU is described, it is understood that the disclosure is not limited to an MCU, and another type auxiliary circuit or control module may be used as well.

In addition to providing wireless communication, the MCU/radio 34 may also be used to provide a digital dimming signal received by the dim pin 60 of the main driver 32 if the lighting fixture 14 is ON. Specifically, in one approach the MCU/radio 34 may generate a pulse width modulated (PWM) dimming signal received by the dim pin 60 of the main driver 32 through a resistor R3 and a smoothing capacitor C6. The resistor R3 and smoothing capacitor C6 may smoothen the PWM signal from the MCU/radio 34 into a constant voltage signal. In the exemplary illustration as shown, the constant voltage signal may be a constant 0.6 voltage signal. The MCU/radio 34 generates the PWM dimming signal based on receiving a dimming signal received over the wireless network 16 by the user input device 17 (shown in FIG. 1) that is wirelessly connected to the MCU/radio 34 through the wireless network 16.

Referring to FIGS. 1-2, the user input device 17 may be any electronic device having wireless capabilities and a user interface 90 for wireless control of the lighting fixture 14 such as, for example, a remote controller, a laptop or tablet computer, or a smartphone. As commonly known by those of ordinary skill in the art, the user input device 17 may generate the dimming signals sent to the MCU/radio 34 based on an individual manipulating a dimming slider 92 of the user input device 17. Those of ordinary skill in the art will also appreciate an individual may turn the lighting fixture 14 ON or OFF by manipulating the buttons 94, 96 of the user input device 17 as well. For example, if an individual selects the ON button 94 of the user input device 17 for turning the lighting fixture 14 ON, then an ON signal may be sent to the MCU/radio 34 though the wireless network 16. Similarly, if an individual selects the OFF button 96 of the user input device 17 for turning the lighting fixture 14 OFF, then an OFF signal may be sent to the MCU/radio 34 through the wireless network 16.

The MCU/radio 34 may also control a switch 78 of the driver circuit 10 based on the ON signal and the OFF signal being sent to the MCU/radio 34 by the user input device 17. In one non-limiting embodiment, the switch 78 may be a negative-positive-negative (NPN) transistor such as a BJT. When the lighting fixture 14 is turned OFF and the OFF signal is sent to the MCU/radio 34 (i.e., the lighting load 12 is not generating light), then a pin 76 of the MCU/radio 34 goes low, thereby turning the switch 78 OFF. When the lighting fixture 14 is turned ON, the ON signal is sent to the MCU/radio 34, thereby causing the pin 76 of the MCU/radio 34 to go high and the switch 78 is turned ON.

The integrated switch 78 is connected to a resistor network 80. The resistor network 80 includes three resistors R4, R5, and R6, where R4 and R5 are arranged in a voltage divider. The overvoltage protection pin 58 of the main driver 32 is connected to the voltage divider 82 of the resistor network 80. When the switch 78 is ON (and the lighting fixture 14 is ON) the resistors R5 and R6 are in parallel with one another. Also, a voltage observed at a node 84 of the resistor network 80 is less than an overvoltage value by a threshold amount of voltage. The node 84 is located between the resistors R4, R5, and R6. The overvoltage value represents the voltage observed at the overvoltage protection pin 58 of the main driver 32 sufficient to trigger the main driver 32 to operate at burst mode of the main driver 32. Since the overvoltage value will trigger burst mode, it should be understood that the overvoltage value is selectively generated by the resistor network 80 if the main driver 32 is required to operate at burst mode. Burst mode of the main driver 32 is explained in greater detail below. For example, in one embodiment, the overvoltage value is about 1.8 volts, and the threshold amount is about 0.6 volts. Thus, the voltage observed at the node 84 may be about 1.2 volts when the switch 78 is ON. The threshold amount may be selected such that the main driver 32 may not be falsely triggered into operating at burst mode.

Once the switch 78 is deactivated and turned OFF (and the lighting fixture 14 is OFF) the resistor R6 drops out of the resistor network 80, and the voltage at the node 84 rises to a value at or above the overvoltage value. In response to receiving the overvoltage value from the resistor network 80, the main driver 32 operates at burst mode. Moreover, once the switch 78 is deactivated, the lighting fixture 14 is OFF and the voltage of the driver circuit 10 at the lighting load 12 may then drop below a working or forward voltage of the lighting load 12. Those of ordinary skill in the art will readily appreciate the forward voltage of the lighting load 12 is the voltage required in order to conduct electricity through the lighting load 12. Thus, if the main driver 32 controls an output voltage within the driver circuit 10 to provide the forward voltage to the lighting load 12, then the lighting load 12 will illuminate. Once the output voltage drops below the forward voltage, then the lighting load 12 becomes non-conductive, and the lighting load 12 is no longer illuminated. In one embodiment, the forward voltage of the lighting load 12 is about 12 volts.

Burst mode is sometimes referred to as a pulse frequency modulation with an intermittent burst of pulses. Burst mode represents a low power consumption mode of the driver circuit 10. Moreover, burst mode may be initiated by an outside disturbance, and is repeated by a reset of the respective IC (i.e., the main driver 32 in the present embodiment). Those of ordinary skill in the art will readily appreciate that burst mode is generally used in a circuit when the demand for power is low, and the main driver 32 may transition out of burst mode once the demand for power increases above some threshold. Thus, once the lighting fixture 14 is turned back ON and the voltage required by the lighting load 12 is at or above the forward voltage, then the main driver 32 transitions out of burst mode. During burst mode, the main driver 32 instructs or controls the switch of the main driver 32 (i.e., the MOSFET within the main driver 32) to operate in one or more burst packets. A burst packet is representative of the switch of the main driver 32 opening and closing once. It is to be appreciated that during burst mode, the voltage produced by the driver circuit 10 may not rise to the forward voltage of the lighting load 12.

It should also be appreciated that during burst mode, the driver circuit 10 may not always operate to sufficiently produce the regulated low voltage supplied to the MCU/radio 34. More specifically, during burst mode a frequency of the burst packets may not always be high enough to maintain a current sufficient to generate the voltage required to operate the MCU/radio 34. Thus, as described in greater detail below, in response to receiving the OFF signal from the user input device 17 (FIG. 1) over the wireless signal, the MCU/radio 34 generates a switching signal sent to the main driver 32. The MCU/radio 34 generates the switching signal in a variety of different ways, which is explained in greater detail below. In response to receiving the switching signal from the MCU/radio 34, the main driver 32 increases the frequency of the burst packets such that the driver circuit 10 may generate and maintain the constant DC voltage required by the MCU/radio 34 during burst mode. In other words, during burst mode the frequency of the burst packets is increased to a threshold frequency, which in turn causes the switch of the main driver 32 to open and close at a frequency sufficient to generate the voltage required to operate the MCU/radio 34.

In one embodiment, the switching signal from the MCU/radio 34 may be based on the PWM dimming signal sent to the main driver 32. Specifically, the MCU/radio 34 includes control logic or circuitry for adjusting the duty cycle of the PWM dimming signal received by the dim pin 60 of the main driver 32 to a threshold duty cycle. Increasing the duty cycle of the PWM dimming to the threshold duty cycle in turn causes the main driver 32 to increase the frequency of the burst packets during burst mode such that the driver circuit 10 may generate the constant DC voltage required by the MCU/radio 34. For example, in one embodiment, if the constant DC voltage supplied to the MCU/radio 34 is about 3.3 volts, then the MCU/radio 34 increases the duty cycle of the PWM dimming signal to the threshold duty cycle, which is about eighty percent. This results in a voltage ranging from between about 0.7 to about 0.8 observed at the dim pin 60 of the main driver 32.

Figure 4:
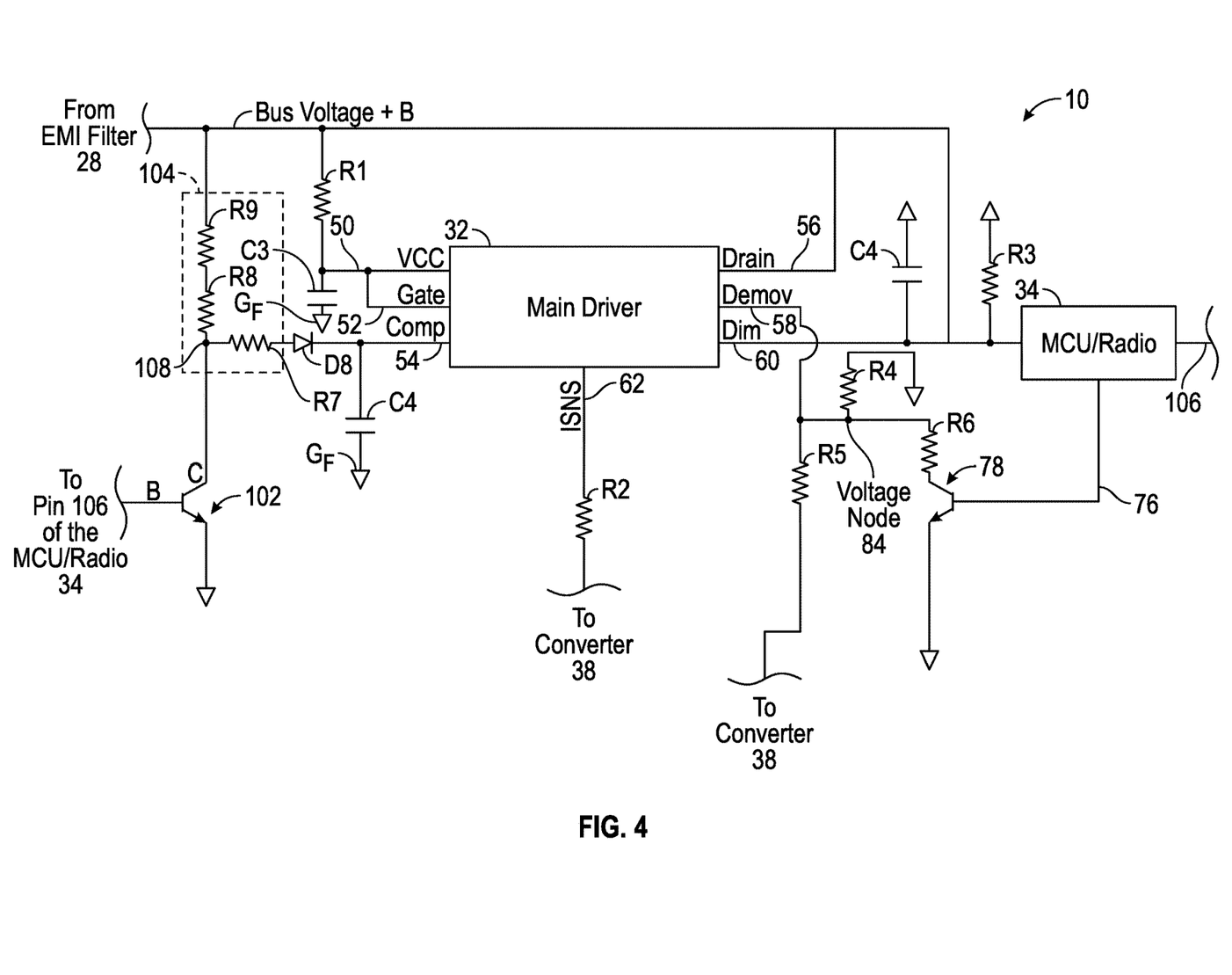
FIG. 4 is an alternative embodiment of the driver circuit shown in FIG. 1.

FIG. 4 is an alternative embodiment of a portion of the driver circuit 10, where the switching signal generated by the MCU/radio 34 activates a switch 102. Similar to the switch 78, in one embodiment the switch 102 may also be a NPN transistor such as, for example, a BJT. The switch 102 may be in communication with the loop compensation pin 54 of the main driver 32. More specifically, the switch 102 may be connected to the loop compensation pin 54 of the main driver 32 through a second resistor network 104 and a diode D8. The second resistor network 104 includes three resistors R7, R8, and R9, where the resistors R8 and R9 are connected in series with one another, and the resistors R7 and R8 are arranged in a voltage divider.

In the embodiment as shown in FIG. 4, the MCU/radio 34 includes a pin 106 connected to a base B of the switch 102.

When the MCU/radio 34 instructs the pin 106 to go low, this in turn will turn the switch 102 OFF. When the MCU/radio 34 instructs the pin 106 to go high, this turns the switch 102 ON. The MCU/radio 34 may control the switch 102 based on the user input sent over the wireless network 16 by the user input device 17 (FIG. 1) wirelessly connected to the MCU/radio 34. More specifically, in response to receiving the OFF signal over the wireless network 16, the pin 106 of the MCU/radio 34 goes low, thereby turning the switch 102 OFF. In response to receiving the ON signal over the wireless network 16, the pin 106 of the MCU/radio 34 goes high, thereby turning the switch 102 ON.

When the switch 102 is ON (and the lighting fixture 14 is ON) the voltage measured at a node 108 of the second resistor network 104 is less than a second overvoltage value by a second threshold amount of voltage. The node 108 is located between the resistors R7 and R8 and a collector C of the switch 102. The second overvoltage value represents the voltage observed at the loop compensation pin 54 of the main driver 32 of the main driver 32 sufficient to increase the frequency of the burst packets to the threshold frequency, which in turn causes the switch of the main driver 32 to open and close at a frequency sufficient to generate the voltage required to operate the MCU/radio 34. It is to be understood that the loop compensation pin 54 may represent a pin or other input of the main driver 32 responsible for setting a response time of the main driver 32. If the response time of the main driver 32 increases, this in turn will also cause the main driver 32 to increase the frequency of the burst packets during burst mode.

For example, in one embodiment, the second overvoltage value is about 2.0 volts, and the second threshold amount is about 0.9 volts. Thus, the voltage observed at the node 108 of the second resistor network 104 may be about 1.1 volts when the switch 102 is ON. The threshold amount may be selected so as to not falsely trigger the main driver 32. However, once the switch 102 is deactivated and turned OFF (and the lighting fixture 14 is OFF), the voltage observed at the node 108 rises to the second overvoltage value (e.g., 2.0 volts). Accordingly, the voltage observed at the loop compensation pin 54 of the main driver 32 rises to a required value. Raising the voltage at the loop compensation pin 54 to the required value in turn increases the response time of the main driver 32 such that the frequency of the burst packets is also increased to the threshold frequency, thereby causing the switch of the main driver 32 to open and close at a frequency sufficient to generate the voltage required to operate the MCU/radio 34. Accordingly, the current flowing through the driver circuit 10 generates the regulated low voltage supplied to the MCU/radio 34.

Figure 5:
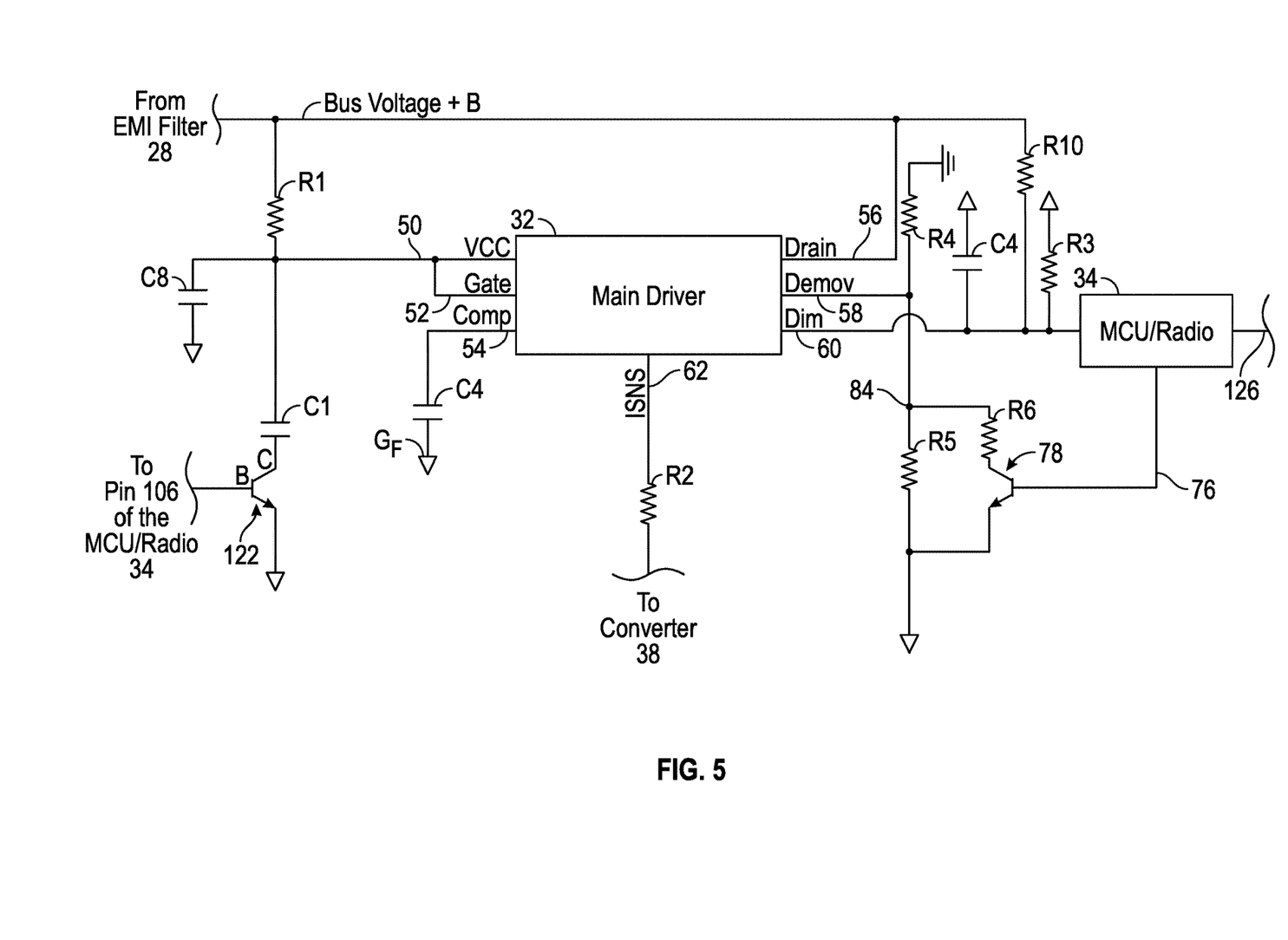
FIG. 5 is yet another embodiment of the driver circuit shown in FIG. 1.

FIG. 5 is yet another embodiment of a portion of the driver circuit 10 where the switching signal generated by the MCU/radio 34 activates a switch 122 in communication with the input pin 50 ($V_{CC}$) of the main driver 32. Similar to the switch 78 shown in FIGS. 2-3 and the switch 102 in FIG. 4, in one embodiment the switch 122 may also be a NPN transistor such as, for example, a BJT. The switch 122 may be connected to the input pin 50 of the main driver 32. More specifically, a collector C of the switch 122 may be connected to the input pin 50 of the main driver 32 through the capacitor C1.

In the embodiment as shown in FIG. 5, the MCU/radio 34 includes a pin 126 connected to a base B of the switch 122. When the MCU/radio 34 instructs the pin 126 to go low, this in turn will turn the switch 122 OFF. When the MCU/radio 34 instructs the pin 126 to go high, this turns the switch 122 ON. The MCU/radio 34 may control the switch 122 based on the user input sent over the wireless network 16 by the user input device 17 (FIG. 1). In response to receiving the OFF signal over the wireless network 16, the pin 126 of the MCU/radio 34 goes low, thereby turning the switch 122 OFF. In response to receiving the ON signal from the wireless network 16 the pin 126 of the MCU/radio 34 goes high, thereby turning the switch 122 ON. Moreover, as seen in the embodiment of FIG. 5, a resistor R10 may be connected to the output of the EMI filter 28 (FIG. 2), i.e., the bus voltage +B of the driver circuit 10.

The capacitor C1 may filter voltage received by the resistor R1, which is connected to the input pin 50 of the main driver 32, when the switch 122 is turned on (and the lighting fixture 14 is also turned ON). The capacitor C1 may also charge when the when the switch 122 is turned on. However, once the switch 122 is turned OFF (and the lighting fixture 14 is also turned OFF) the capacitor C1 is removed from the driver circuit 10. This in turn will decrease the overall capacitance observed at the input pin 50 of the main driver 32. Instead, only the resistor R1 and a capacitor C8 are connected to the input pin 50 of the main driver 32. The voltage at the input pin 50 of the main driver 32 may now increase and decrease at a quicker rate, since the overall capacitance at the input pin 50 of the main driver 32 has decreased. Thus, the main driver 32 may now reset itself more quickly, which in turn will increase the frequency of the burst packets to the threshold frequency, which in turn causes the switch of the main driver 32 to open and close at a frequency sufficient to generate the voltage required to operate the MCU/radio 34.

The predefined voltage represents the voltage observed at the input pin 50 of the main driver 32 sufficient to increase the frequency of the burst packets to the threshold frequency. In one embodiment, the capacitance of the capacitor C1 is about 0.047 µF, the capacitance of the capacitor C8 is about 0.22 µF, and the predefined voltage observed at the input pin 50 is about 12 volts. When the input pin 50 of the main driver 32 observes the predefined voltage, this in turn may cause a time constant T of the main driver 32 to also increase in value as well. Increasing the time constant T of the main driver 32 results in the main driver 32 being reset, and in turn increases the frequency of the burst packets during burst mode.

Figure 6:
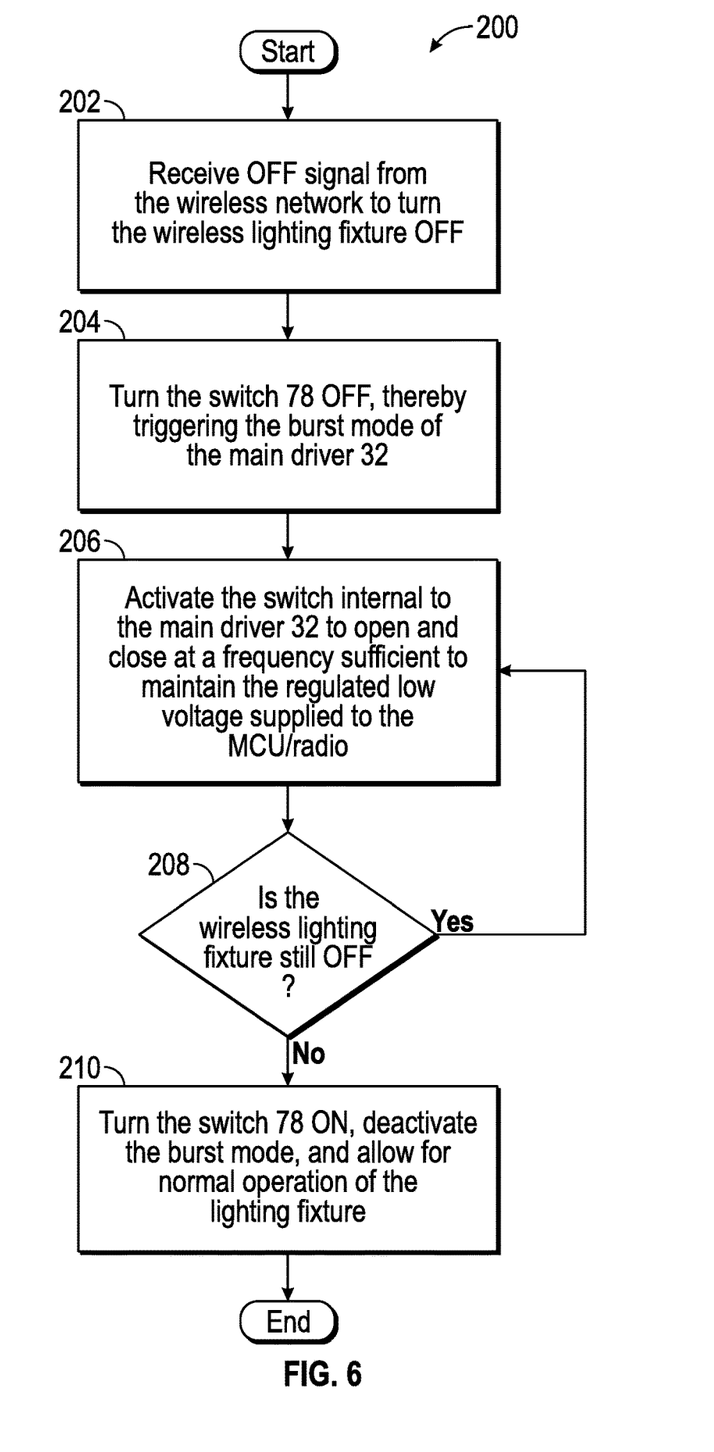
FIG. 6 is an exemplary process flow diagram illustrating a method of providing constant low voltage DC power to the MCU/radio shown in FIG. 1.

FIG. 6 is an exemplary process flow diagram illustrating a method 200 of providing constant DC voltage to the MCU/radio 34 once the lighting fixture 14 is turned OFF. Referring generally to FIGS. 1-6, method 200 may begin at block 202. In block 202, the MCU/radio 34 monitors the wireless network 16 for the OFF signal from the user input device 17 (FIG. 1). As explained above, the OFF signal indicates an individual has selected the button 96 of the user input device 17 for turning the lighting fixture 14 OFF. Method 200 may then proceed to block 204.

In block 204, in response to receiving the OFF signal from the user input device 17, the pin 76 of the MCU/radio 34 goes low. This in turn will turn the switch 78 OFF. Once the switch 78 is turned OFF (and the lighting fixture 14 is OFF) the resistor R6 drops out of the resistor network 80, and the voltage at the node 84 rises above the overvoltage value, thereby triggering burst mode of the main driver 32. Method 200 may then proceed to block 206.

In block 206, the MCU/radio 34 generates the switching signal sent to the main driver 32, which increases the frequency of the burst packets to the threshold frequency, thereby causing the switch of the main driver 32 to open and close at a frequency sufficient to generate the constant DC voltage required by the MCU/radio 34. As explained above, there are a number of ways to increase the frequency of the switch of the main driver 32. Method 200 may then proceed to decision block 208.

In block 208, if the lighting fixture 14 continues to be turned off, then method 200 may return to block 206. However, if the lighting fixture 14 is no longer OFF (i.e., an individual selects the ON button 94 of the user input device 17), then method 200 may proceed to block 210.

In block 210, the switch 78 is turned ON. Once the switch 78 is ON, the voltage at the node 84 of the resistor network 80 drops to a voltage value (e.g., 1.2 voltage), which is below the overvoltage value (e.g., 1.8 volts) by the threshold amount (e.g., 0.6 volts). Thus, the voltage observed at the overvoltage protection pin 58 of the main driver 32 drops to a value such that the main driver 32 may transition out of burst mode. Method 200 may then terminate.

Referring generally to the figures, the disclosed driver circuit 10 includes a relatively efficient, cost-effective and simple approach for providing constant DC voltage to an auxiliary circuit (e.g., the MCU/radio 34) without the need for dedicated power circuitry. The driver circuits currently available typically include a dedicated switched mode power supply for delivering power to the auxiliary circuit, which in turn adds numerous components to the lighting fixture. Moreover, it should also be appreciated that a dedicated switched mode power supply also consumes valuable space within the fixture, and further increases overall costs. In contrast, the disclosed driver circuit 10 leverages the existing electronic components in order to provide the required constant DC voltage.

While the forms of apparatus and methods herein described constitute preferred embodiments of this disclosure, it is to be understood that the disclosure is not limited to these precise forms of apparatus and methods, and the changes may be made therein without departing from the scope of the disclosure.

What is claimed is:

1. A driver circuit for providing substantially constant DC voltage to an auxiliary circuit, the driver circuit comprising:
    a lighting load having a forward voltage, the lighting load selectively illuminated based on an output voltage being provided to the lighting load that is at least the forward voltage;
    a main driver for controlling current and voltage within the driver circuit such that when the lighting load is to be illuminated, then the current delivered to the lighting load is regulated by the main driver, and when the the lighting load is not to be illuminated, then the output voltage delivered to the lighting load is controlled by the main driver to be below the forward voltage; and
    a switch drivable by the main driver, the main driver driving the switch at a burst mode in response to receiving an overvoltage value from the driver circuit, wherein the output voltage is less than the forward voltage of the lighting load in response to the switch operating at the burst mode and the lighting load not being illuminated;
    wherein the auxiliary circuit is in communication with the main driver, and the driver circuit provides the auxiliary circuit with a substantially constant DC voltage at all operating conditions.

2. The driver circuit of claim 1, wherein the main driver causes the switch to operate in at least one burst packet during the burst mode, and wherein the burst packet is representative of the switch opening and closing once.

3. The driver circuit of claim 2, wherein the auxiliary circuit monitors a sensor for an OFF signal.

4. The driver circuit of claim 3, wherein the auxiliary circuit induces a switching signal at an OFF input of the main driver in response to receiving the OFF signal.

5. A driver circuit for providing substantially constant DC voltage to an auxiliary circuit, the driver circuit comprising:
    a lighting load having a forward voltage, the lighting load selectively illuminated based on an output voltage being provided to the lighting load that is at least the forward voltage;
    a main driver for controlling voltage within the driver circuit such that when the lighting load is to be illuminated, then the output voltage provided to the lighting load is at least the forward voltage, and when the lighting load is not to be illuminated, then the voltage delivered to the lighting load is below the forward voltage; and
    a switch drivable by the main driver, the main driver driving the switch at a burst mode in response to receiving an overvoltage value from the driver circuit, wherein the output voltage is less than the forward voltage of the lighting load in response to the switch operating at the burst mode and the lighting load not being illuminated;
    wherein the auxiliary circuit is in communication with the main driver, and the driver circuit provides the auxiliary circuit with a substantially constant DC voltage at all operating conditions.

6. The driver circuit of claim 5, wherein the main driver causes the switch to operate in at least one burst packet during the burst mode, and wherein the burst packet is representative of the switch opening and closing once.

7. The driver circuit of claim 6, wherein the auxiliary circuit monitors a sensor for an OFF signal.

8. The driver circuit of claim 7, wherein the auxiliary circuit induces a switching signal at an OFF input of the main driver in response to receiving the OFF signal.

9. A driver circuit for providing substantially constant DC voltage to an auxiliary circuit, the driver circuit comprising:
    a lighting load having a forward voltage, the lighting load selectively illuminated based on an output voltage being provided to the lighting load that is at least the forward voltage of the lighting load;
    a switch;
    a network that selectively generates an overvoltage value; and
    a main driver including a plurality of inputs, the main driver in communication with the switch and the network, the main driver causing the switch to operate in burst packets at a burst mode in response to receiving the overvoltage value from the network, the main driver controlling voltage to the lighting load such that when the lighting load is not to be illuminated then the forward voltage is not provided to the lighting load and the lighting load is not illuminated;
    wherein the auxiliary circuit is in communication with the main driver, and the auxiliary circuit is configured to induce a switching signal at one of the plurality of inputs of the main driver in response to a voltage in the auxiliary circuit below a substantially constant voltage required by the auxiliary circuit, and in response to receiving the switching signal the main driver increases a frequency of the burst packets to a threshold frequency to generate the substantially constant DC voltage required by the auxiliary circuit during burst mode.

10. The driver circuit of claim 9, wherein the switch is part of the main driver.

11. The driver circuit of claim 9, wherein the switch is located external to the main driver.

12. The driver circuit of claim 9, wherein the switch is a metal-oxide-semiconductor field-effect transistor (MOSFET).

13. The driver circuit of claim 9, wherein the network includes a first resistor, a second resistor, a third resistor, and a node located between the first resistor, the second resistor, and the third resistor, and wherein the first resistor and the second resistor are arranged in a voltage divider.

14. The driver circuit of claim 13, comprising a second switch, wherein when the second switch is turned OFF then the third resistor drops out of the network and the voltage at the node rises to a value at or above the overvoltage value.

15. The driver circuit of claim 9, wherein at least one of the main driver and the auxiliary circuit are connected to a floating ground.

16. The driver circuit of claim 9, wherein at least one of the main driver and the auxiliary circuit are connected to a common ground of the driver circuit.

17. The driver circuit of claim 9, wherein the auxiliary circuit is in communication with a second switch, and in response to the second switch being turned OFF the network generates the overvoltage value.

18. The driver circuit of claim 9, wherein the lighting load is a light emitting diode (LED).

19. The driver circuit of claim 9, wherein the lighting load includes a forward voltage of about 12 volts.

20. The driver circuit of claim 9, wherein the main driver is for light emitting diode (LED) dimming control, and wherein one of the plurality of inputs of the main driver includes a dimming input.

21. The driver circuit of claim 20, wherein the auxiliary circuit generates a pulse-width modulated (PWM) signal received by the dimming input of the main driver.

22. The driver circuit of claim 21, wherein the auxiliary circuit increases the duty cycle of the PWM signal to a threshold duty cycle, and wherein increasing the duty cycle of the PWM signal to the threshold duty cycle causes the main driver to increase the frequency of the burst packets during burst mode such that the driver circuit generates the constant DC voltage.

23. The driver circuit of claim 9, wherein the auxiliary circuit is in communication with a second switch, and wherein the second switch is in communication with a loop compensation input of the main driver.

24. The driver circuit of claim 23, wherein when the second switch is turned OFF then the voltage at the loop compensation input rises to a required value to increase a response time of the main driver such that the main driver increases the frequency of the burst packets to the threshold frequency.

25. The driver circuit of claim 9, wherein the auxiliary circuit is in communication with a second switch, and wherein the second switch is in communication with a power input of the main driver through a capacitor.

26. The driver circuit of claim 25, wherein when the second switch is OFF then the capacitor charges, and when the second switch is ON then the capacitor is removed from the driver circuit.

\* \* \* \* \*